US006733328B2

United States Patent
Lin et al.

(10) Patent No.: US 6,733,328 B2
(45) Date of Patent: May 11, 2004

(54) USB CABLE ADAPTER WITH CABLE WINDING MECHANISM

(76) Inventors: Chen Che Lin, No. 127-1, Nuannuan St., Nuannuan Chiu, Keelung City (TW), 205; Te Kuang Wei, No. 15, Alley 39, Lane 321, Sec. 2, Lunggang Rd., Jungli City, Taoyuan County (TW), 320

( * ) Notice: Subject to any disclaimer, the term of this patent is extended or adjusted under 35 U.S.C. 154(b) by 0 days.

(21) Appl. No.: 10/426,794

(22) Filed: May 1, 2003

(65) Prior Publication Data

US 2003/0207611 A1 Nov. 6, 2003

(30) Foreign Application Priority Data

May 2, 2002 (TW) ..................................... 91206121 U
May 2, 2002 (TW) ..................................... 91206122 U

(51) Int. Cl.[7] .............................................. H01R 13/72
(52) U.S. Cl. ...................................... 439/501; 439/638
(58) Field of Search ................................. 439/501, 502, 439/164, 638

(56) References Cited

U.S. PATENT DOCUMENTS

| 6,337,444 B1 | * | 1/2002 | Liao | ........................... 174/135 |
| 6,416,355 B1 | * | 7/2002 | Liao | ........................... 439/501 |
| 6,589,069 B1 | * | 7/2003 | Liao | ........................... 439/501 |

* cited by examiner

Primary Examiner—Renee Luebke
Assistant Examiner—Briggitte R. Hammond
(74) Attorney, Agent, or Firm—Rosenberg, Klein & Lee

(57) ABSTRACT

A cable winding device of a USB cable adapter is disclosed. The device comprises a case including a spool and a straight groove; a crown shaped rotating mechanism comprising a channel put on the spool, two opposite edge openings, an internal curved trough, a cavity adjacent the curved trough, and an arcuate trough adjacent the cavity; a roller in the straight groove; and a worm spring secured onto the spool. A pulling of a flat cable causes the roller to move toward the arcuate trough with the worm spring being deformed while the roller is sliding. A release of the pulling causes the roller to move in the cavity for locking. A slight pulling of the cable from the locked position clears the roller from the cavity to move in the curved trough with stored energy of the compressed worm spring released for winding the cable.

3 Claims, 13 Drawing Sheets

USB CABLE ADAPTER WITH CABLE WINDING MECHANISM

BACKGROUND OF THE INVENTION

1. Field of the Invention

The present invention relates to USB (universal serial bus) cable and more particularly to a USB cable adapter with an improved cable winding mechanism.

2. Description of Related Art

A conventional USB cable adapter is shown in FIG. 1. Its drawback is that no cable winding mechanism is provided. Hence, a user has to wind cable 1a manually for storage. The cable winding process is a time consuming task if length of the cable 1a is relatively long.

Thus, it is desirable to provide a USB cable adapter having an improved cable winding mechanism in order to overcome the above drawback of the prior art.

SUMMARY OF THE INVENTION

It is an object of the present invention to provide a USB cable adapter comprising a first USB connector; a second connector; and a cable winding mechanism interconnected the first and the second connectors, the mechanism comprising a case comprising a substantially circular first case element including a spool extended inward from a center thereof and a longitudinal gap cut through the spool, an a substantially circular second case element matingly secured to the first case element, the second case element including a straight groove extended outwardly from a center thereof; a crown shaped rotating mechanism comprising a channel formed at a center thereof, the channel being tightly put on the spool, two opposite openings formed at a periphery thereof, an internal curved trough, a cavity disposed adjacent the curved trough, and an arcuate trough disposed adjacent the cavity and being in communication with one end of the curved trough; a roller moveably disposed at a junction of the straight groove and the curved trough in a non-operating position; a flat cable having one end coupled to the first USB connector and the other end coupled to the second connector; and a worm spring having an inner end formed as a straight piece inserted into the gap for securing onto the spool, the worm spring being received in the troughs.

It is another object of the present invention to provide a cable winding device interconnected first and second end connectors of a USB cable adapter, comprising a case comprising a substantially circular first case element including a spool extended inward from a center thereof and a longitudinal gap cut through the spool, an a substantially circular second case element matingly secured to the first case element, the second case element including a straight groove extended outwardly from a center thereof; a crown shaped rotating mechanism comprising a channel formed at a center thereof, the channel being tightly put on the spool, two opposite openings formed at a periphery thereof, an internal curved trough, a cavity disposed adjacent the curved trough, and an arcuate trough disposed adjacent the cavity and being in communication with one end of the curved trough; a roller moveably disposed at a junction of the straight groove and the curved trough in a non-operating position; a flat cable having one end coupled to the first USB connector and the other end coupled to the second connector; and a worm spring having an inner end formed as a straight piece inserted into the gap for securing onto the spool, the worm spring being received in the troughs, wherein a pulling of the cable causes the rotating mechanism to rotate counterclockwise and cause the roller to move toward the arcuate trough with the worm spring being deformed while the roller is sliding; a release of the pulling causes the roller to move in the cavity for locking; and a slight pulling of the cable from the locked position clears the roller from the cavity to move in the curved trough with stored energy of the compressed worm spring released so as to rotate the rotating mechanism clockwise for winding the cable.

The above and other objects, features and advantages of the present invention will become apparent from the following detailed description taken with the accompanying drawings.

DETAILED DESCRIPTION OF THE PREFERRED EMBODIMENTS

Figure 1:
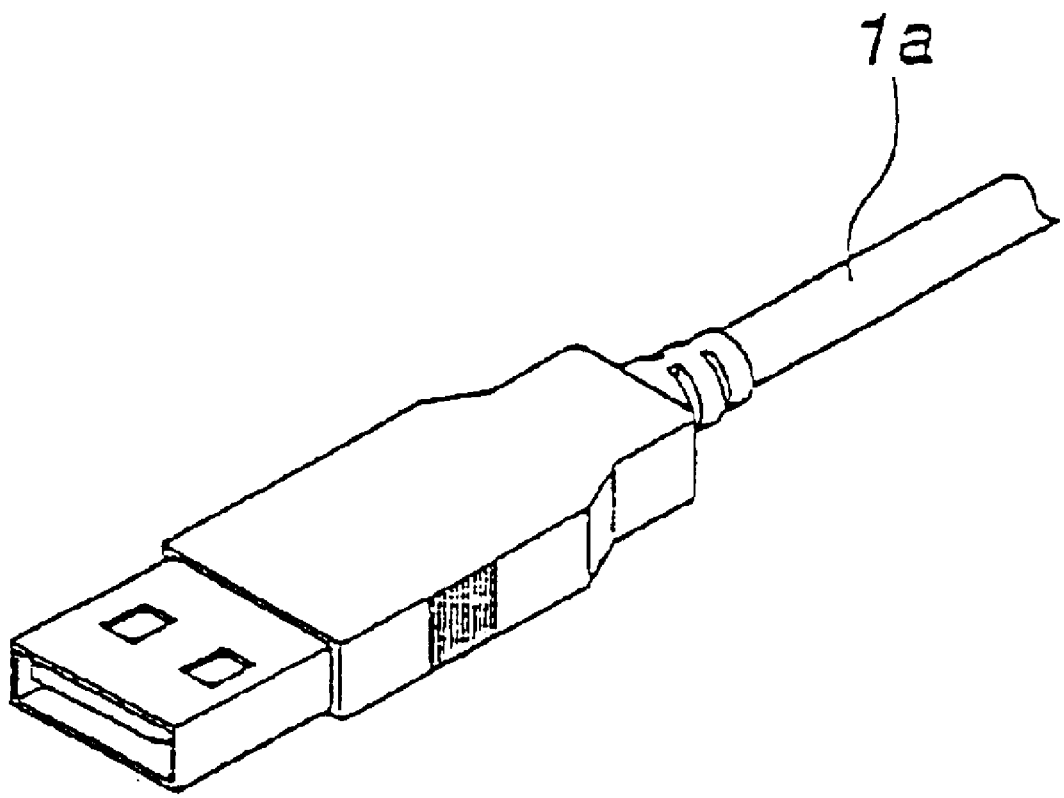
FIG. 1 is a perspective view of a conventional USB cable adapter.
Figure 2:
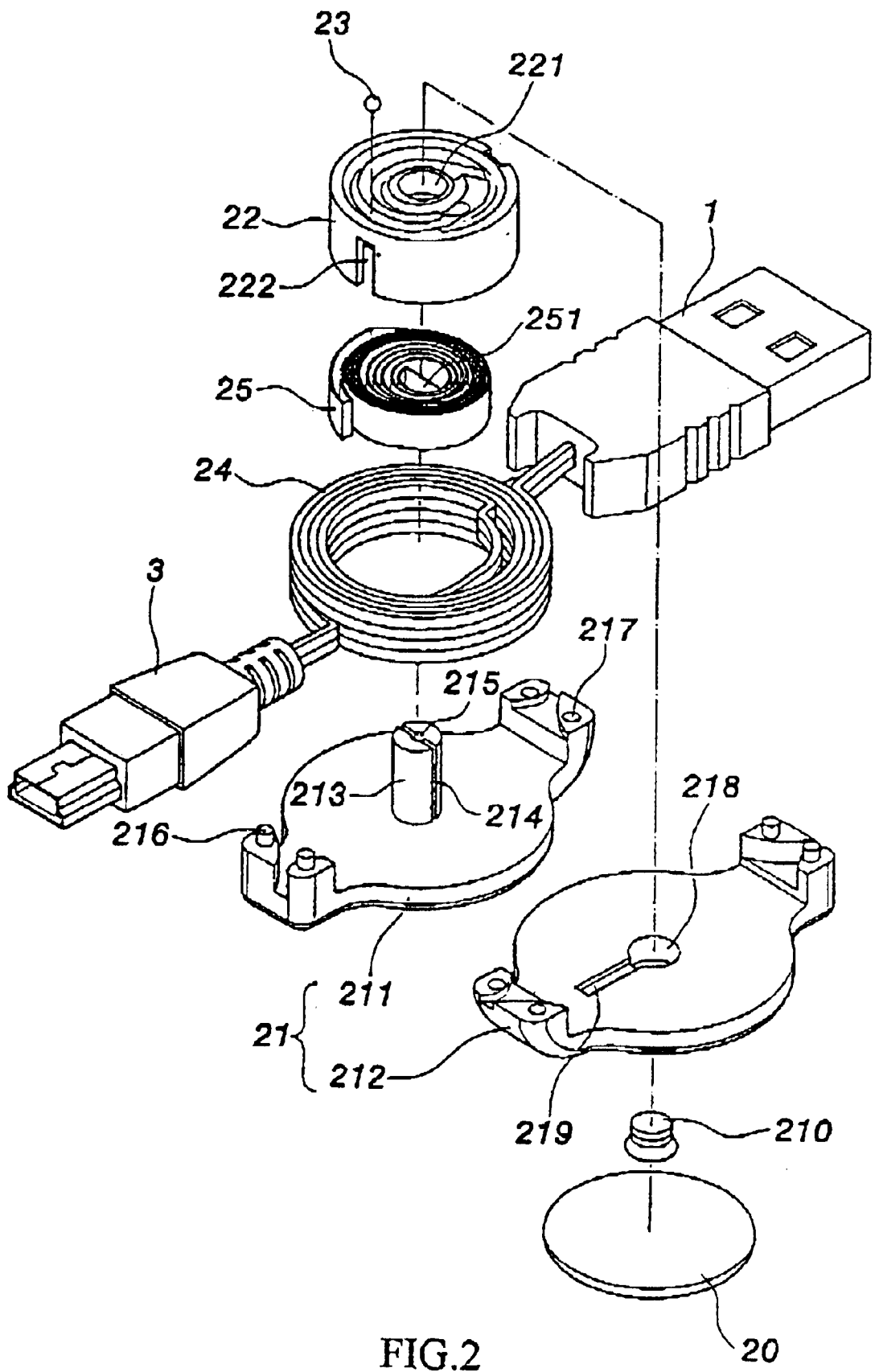
FIG. 2 is an exploded view of a preferred embodiment of USB cable adapter with a cable winding mechanism according to the invention.
Figure 3:
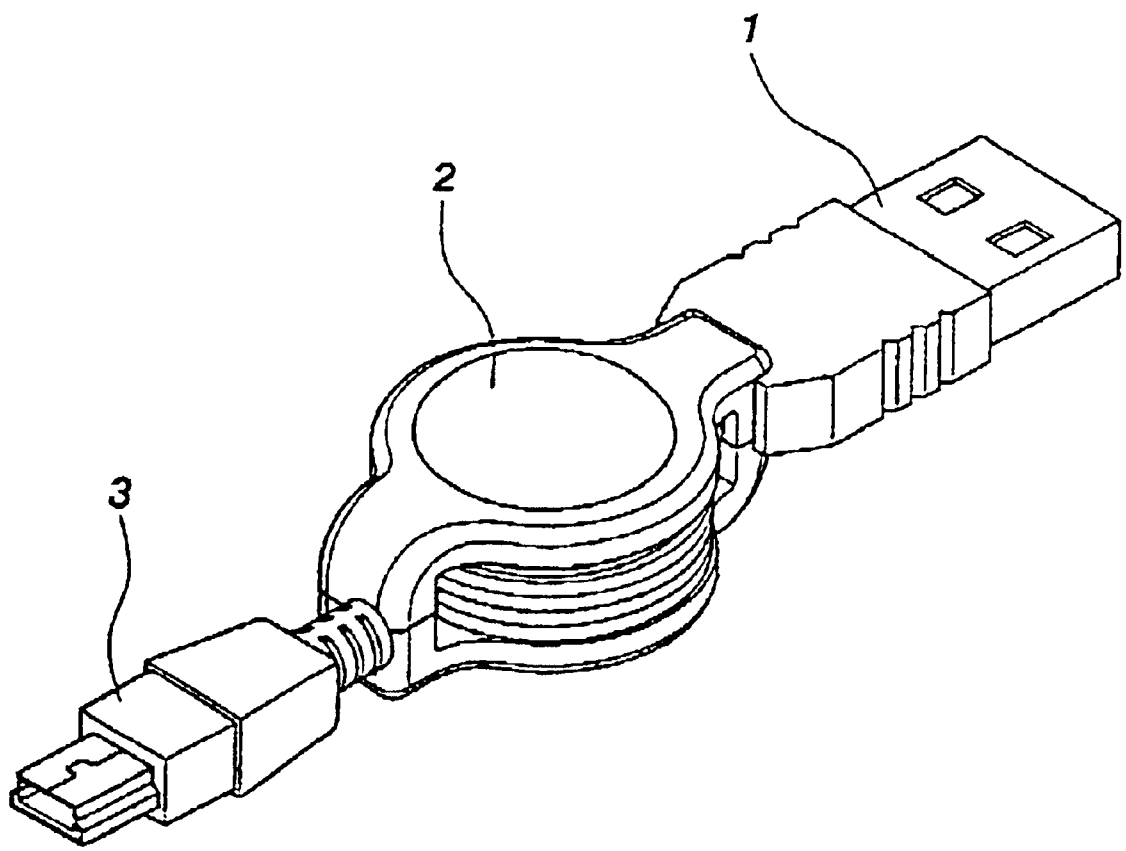
FIG. 3 is an assembled view of FIG. 2.
Figure 4:
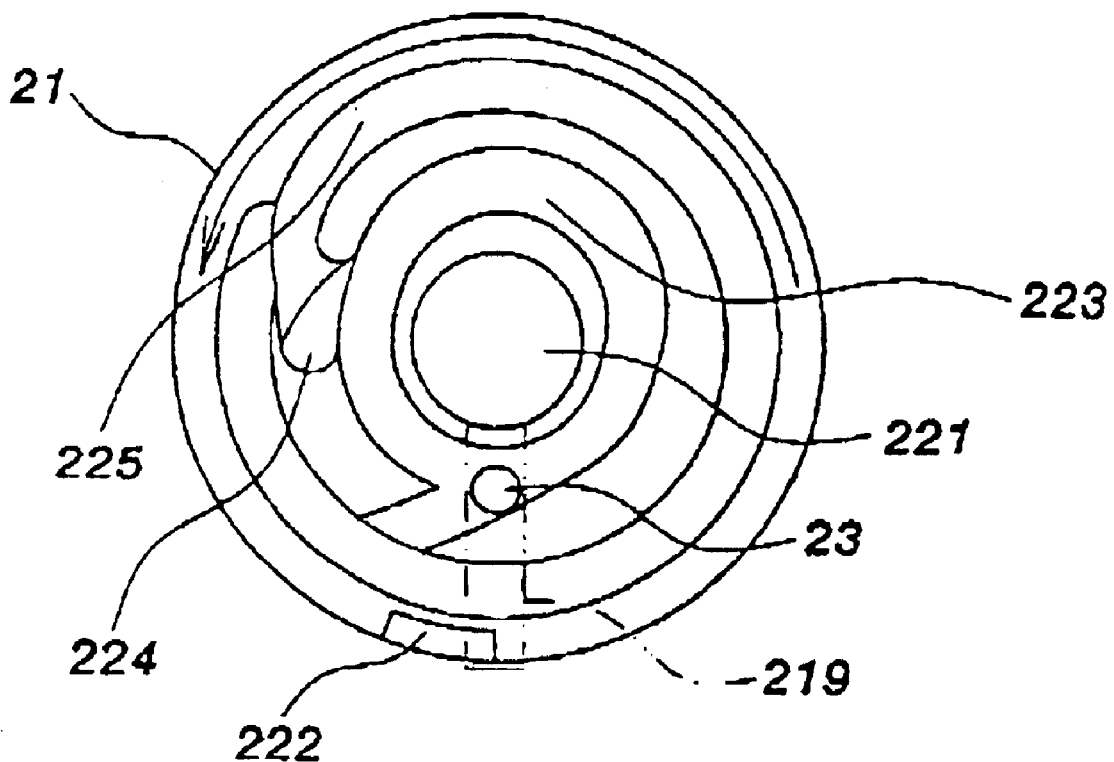
FIG. 4 is a top plan view of the cable winding mechanism with a roller in an non-operating position.

Referring to FIGS. 2, 3 and 4, a preferred embodiment of USB cable adapter of the invention is shown. The USB cable adapter comprises a first USB connector 1 coupled to a computer, a second connector 3 coupled to a charger or digital camera, and a cable winding mechanism 2 interconnected the first and the second USB connectors 1 and 3. The second connector 3 comprises a case 21, a crown shaped rotating mechanism 22, a roller 23, a flat cable 24 having a predetermined length, and a worm spring 25. Each component will be described in detail below.

The case 21 comprises a substantially circular first case element 211 and a substantially circular second case element 212. A spool 213 is extended inward from a center of the first case element 211. A longitudinal gap 214 is cut through the spool 213. A thread aperture 215 is formed in a center of the gap 214. A pair of projections 216 are formed at one projected portion of the first case element 211 and a pair of indentations 217 are formed at the opposite projected portion thereof. Correspondingly, a pair of second projections are formed at one projected portion of the second case element 212 and a pair of second indentations are formed at the opposite projected portion thereof. Hence, the first and the second case elements 211 and 212 can be matingly coupled together by snapping the projections 216 into the second indentations and snapping the second projections into the indentations 217 respectively. A hole 218 is formed at a center of the second case element 212 so that a fastener (e.g., screw) 210 can be driven through the hole 218 into the aperture 215 for fastening the first and the second case elements 211 and 212 together. A straight groove 219 is extended outwardly from the hole 218. A cap 20 is formed on top of the second case element 212.

A channel 221 is formed at a center of the rotating mechanism 22. The channel 221 is tightly put on the spool 213. Two opposite openings 222 are formed at a periphery of the rotating mechanism 22. A curved trough 223 is formed in the rotating mechanism 22. A cavity 224 is provided adjacent the curved trough 223. Also, an arcuate trough 225 is formed adjacent the cavity 224 and is in communication with one end of the curved trough 223.

The roller 23 is moveable along the straight groove 219 while the cable winding mechanism is operating as detailed later. One end of the cable 24 is coupled to the first USB connector 1, the other end thereof is coupled to the second connector 3, and the intermediate portion thereof is wound inside of the rotating mechanism 22 between the openings 222. An inner end of the worm spring 25 is formed as a straight piece inserted into the gap 214 for anchoring the worm spring 25 onto the spool 213. Also, the worm spring 25 is received in the troughs of the rotating mechanism 22. In a non-operating position the roller 23 is disposed at a junction of the straight groove 219 and the curved trough 223.

Figure 5:
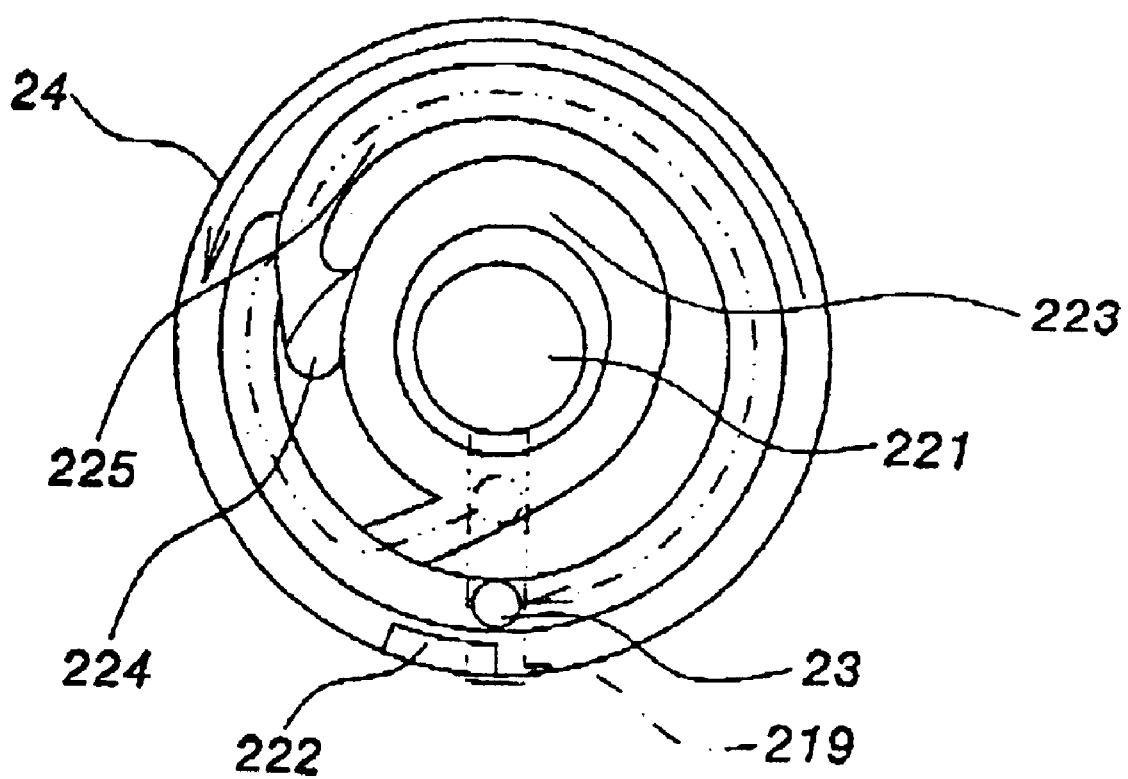
FIG. 5 is view similar to FIG. 4 where the cable is pulling while a rotating mechanism is rotating.
Figure 6:
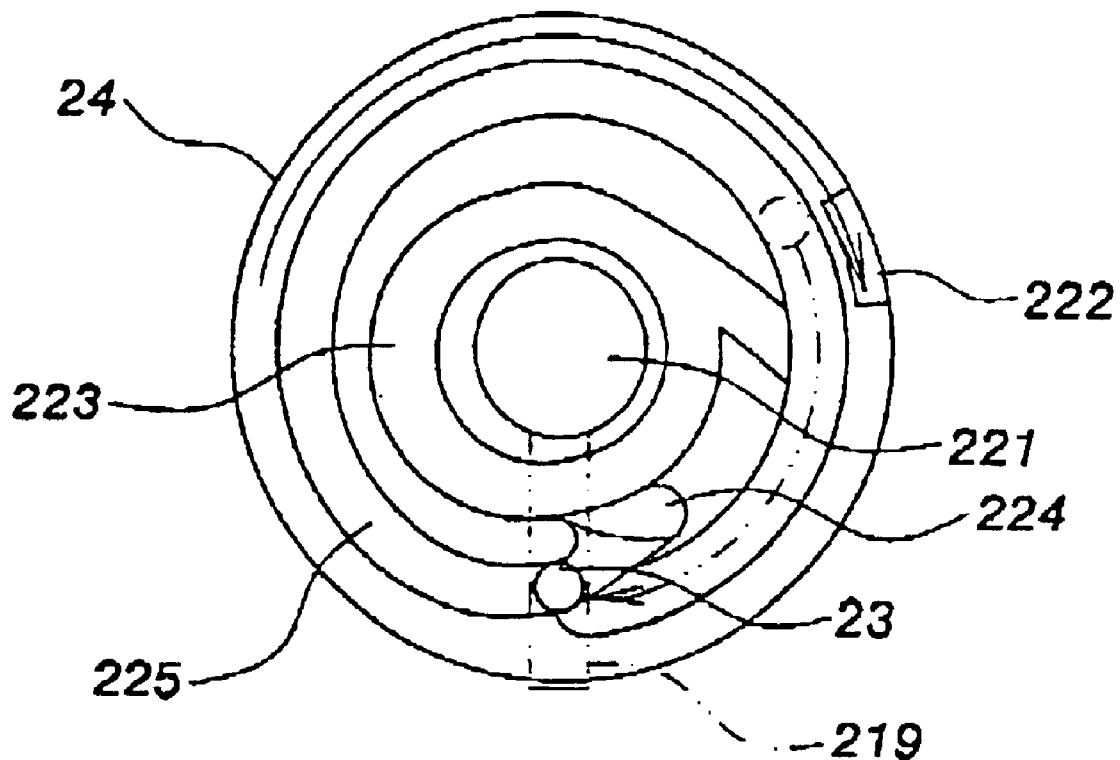
FIG. 6 is view similar to FIG. 4 where a worm spring is being deformed while the rotating mechanism is rotating.
Figure 7:
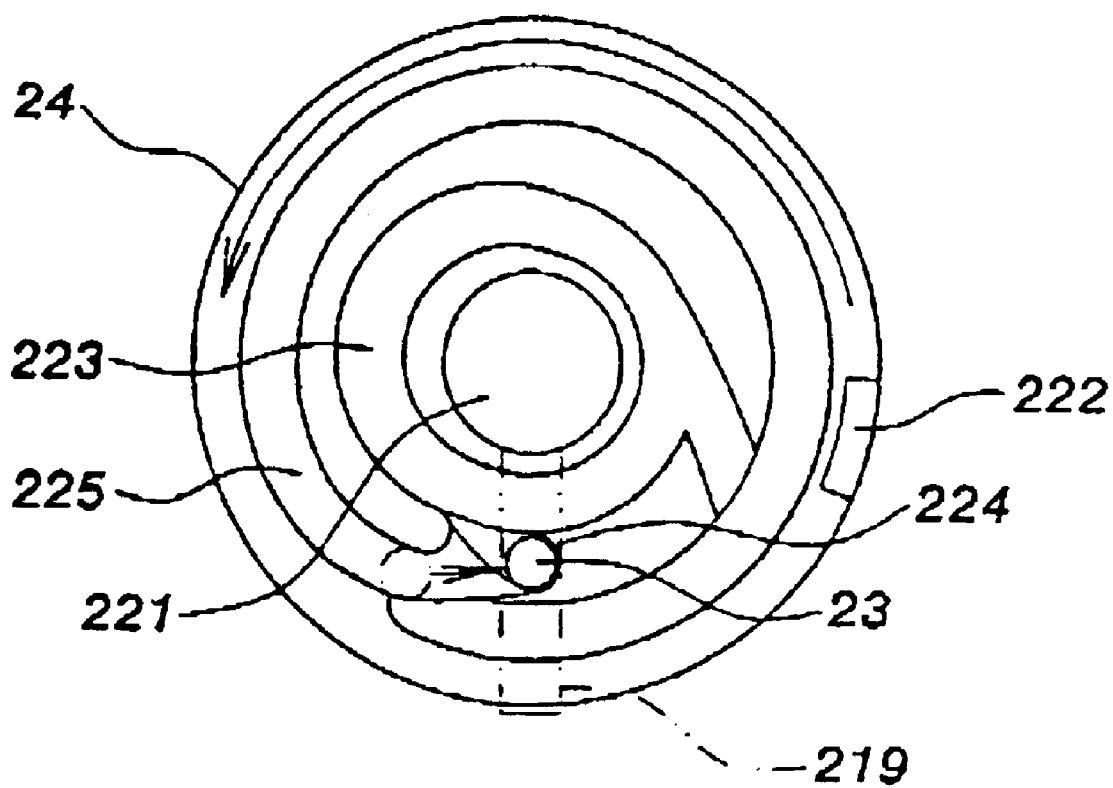
FIG. 7 is view similar to FIG. 4 where the cable is locked after pulling a predetermined distance from the mechanism.
Figure 8:
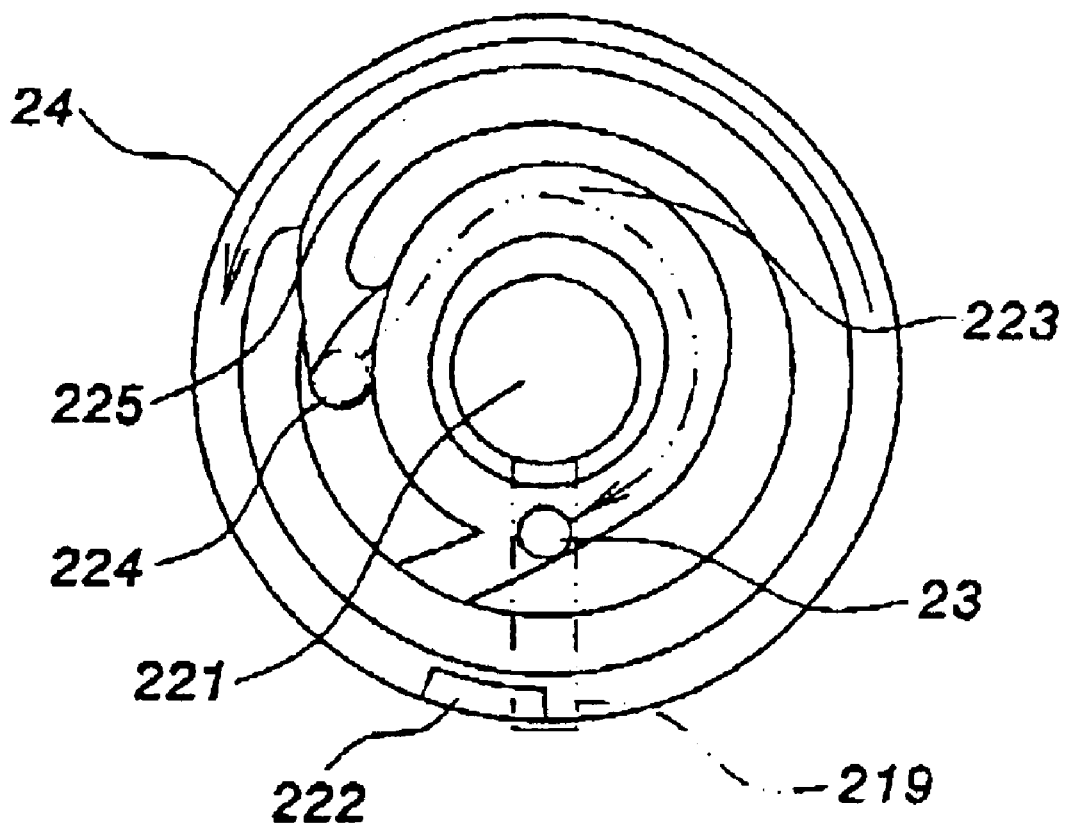
FIG. 8 is view similar to FIG. 4 where the cable is again being pulled while the rotating mechanism is rotating.

Referring to FIGS. 5 to 8 in conjunction with FIG. 4, a pull operation of the cable 24 from the cable winding mechanism will now be described. A pulling of the cable 24 from the mechanism will cause the rotating mechanism 22 to rotate counterclockwise and cause the roller 23 to move toward the arcuate trough 225 (FIG. 5). At the same time, the worm spring 25 is being deformed while the roller 23 is sliding during the continuous cable pulling process (FIG. 6). A sudden release of the pulling will cause the roller 23 to move in the cavity 224 for locking. In other words, a user can lock the cable 24 by releasing the cable 24 after have pulled a desired length of the cable 24 from the mechanism (FIG. 7). Again, a continuous pulling of the cable 24 from the locked position will cause the cable 24 to clear from the cavity 224 to move in the curved trough 223 (FIG. 8). Eventually, release of the cable 24 causes the roller 23 to move in the cavity 224 again for locking.

Figure 9:
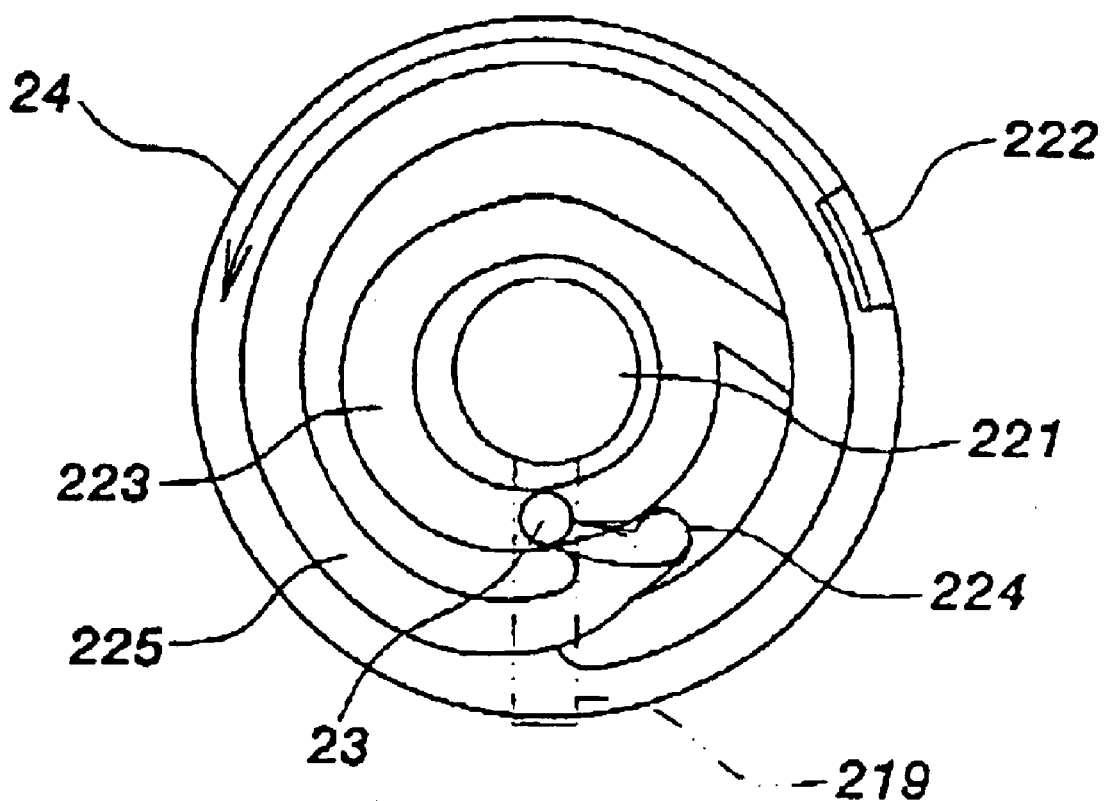
FIG. 9 is view similar to FIG. 4 where the cable is being rewound while the rotating mechanism is rotating in an initial phase.
Figure 10:
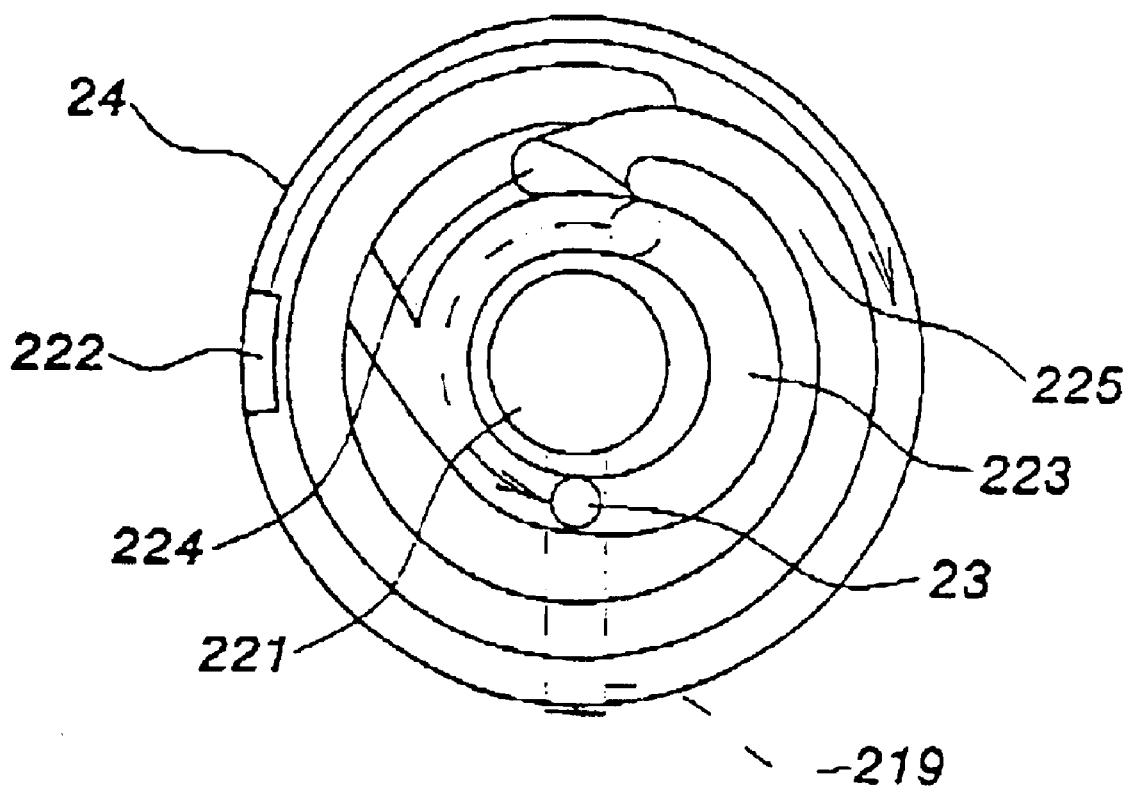
FIG. 10 is view similar to FIG. 4 where the cable is being rewound in a subsequent phase.

Referring to FIGS. 9 and 10, a rewinding operation of the cable 24 will now be described. A user can slightly pull the cable 24 to cause the roller 23 to clear from the cavity 224 to move in the curved trough 223. Next, release the cable 24 for letting the compressed worm spring 25 to release its stored energy to rotate the rotating mechanism 22 clockwise (FIG. 10). As an end, the cable 24 is completely rewound inside the rotating mechanism 22 if no stopping action is taken.

In view of the above, it is envisaged that a desired length between the first and the second USB connectors 1 and 3 can be easily obtained suitably pulling or winding the cable 24. Note that the first USB connector 1 and/or the second connector 3 may be replaced by at least one non-USB connector as detailed in the following preferred embodiments.

Figure 11:
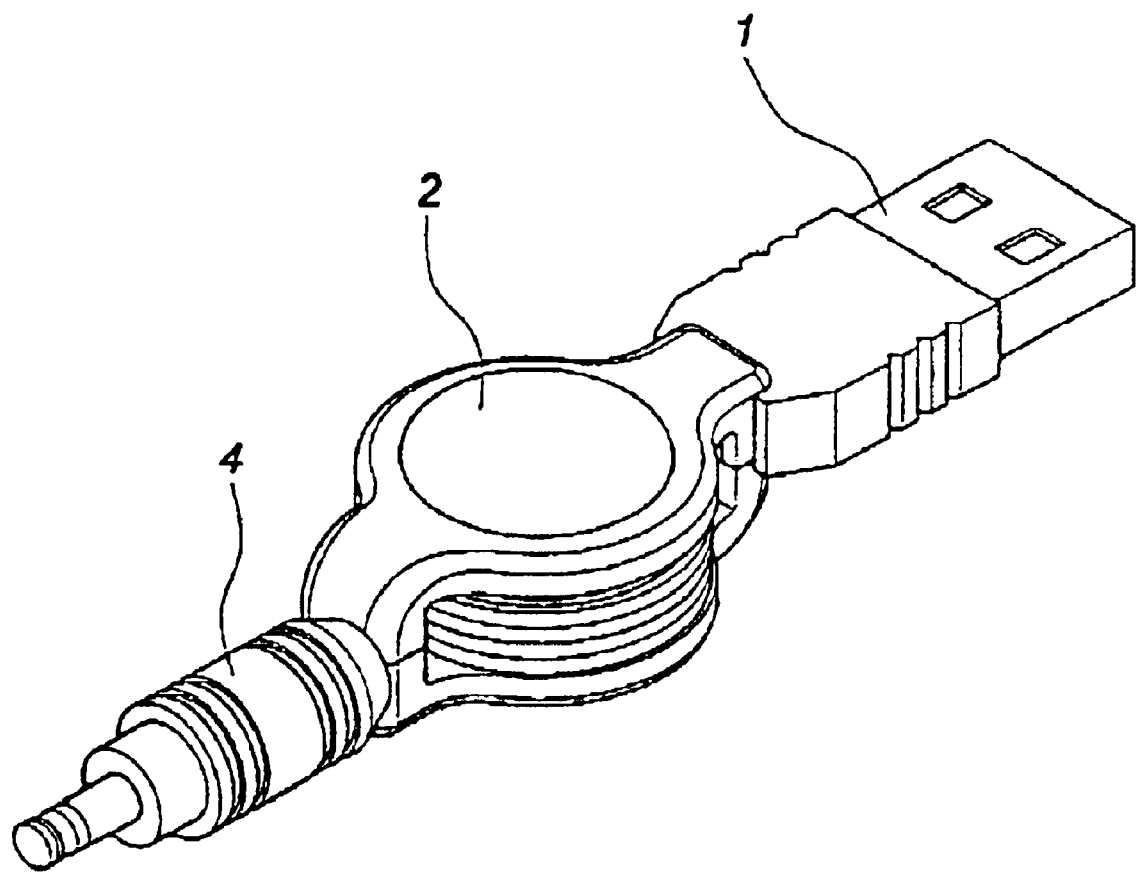
FIG. 11 is a perspective view of another preferred embodiment of USB cable adapter with a cable winding mechanism according to the invention.

Referring to FIG. 11, there is shown another preferred embodiment of USB cable adapter with a cable winding mechanism according to the invention. In this preferred embodiment the second connector 3 is replaced with a connector for video 4.

Figure 12:
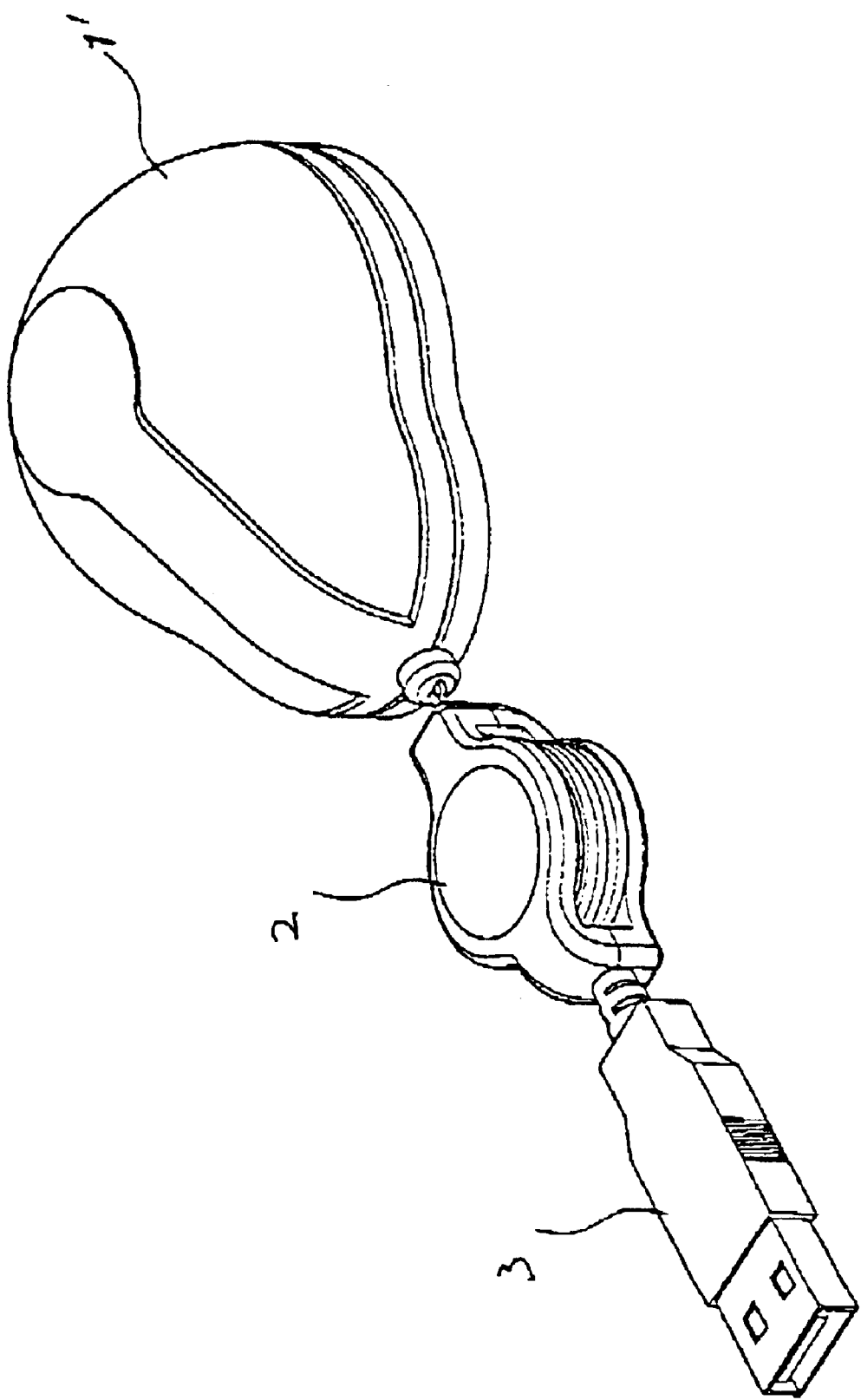
FIG. 12 is a perspective view of still another preferred embodiment of USB cable adapter with a cable winding mechanism according to the invention.

Referring to FIG. 12, there is shown still another preferred embodiment of USB cable adapter with a cable winding mechanism according to the invention. In this preferred embodiment the first USB connector 1 is replaced with a computer mouse 1'.

Figure 13:
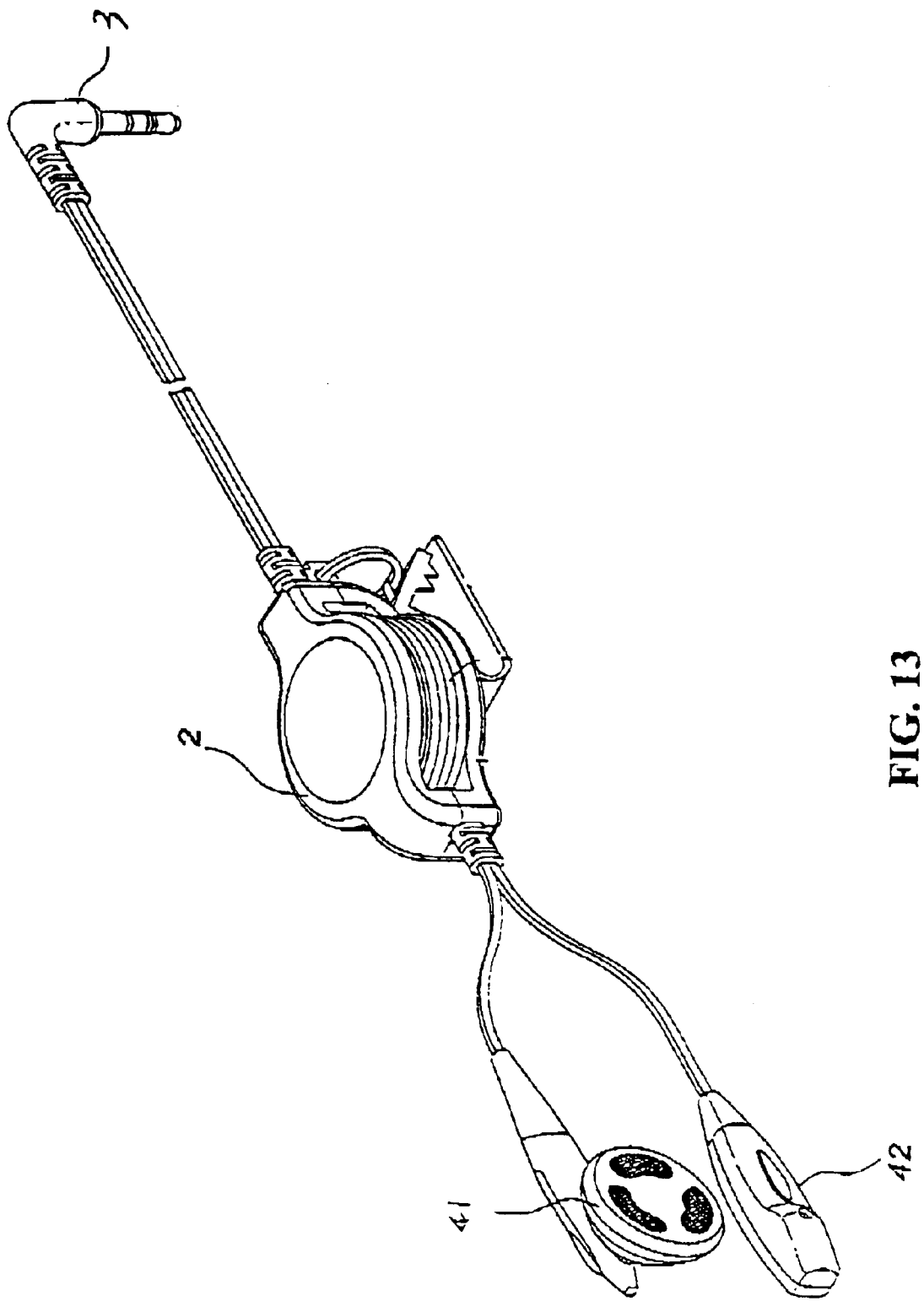
FIG. 13 is a perspective view of a further preferred embodiment of USB cable adapter with a cable winding mechanism according to the invention.

Referring to FIG. 13, there is shown a further preferred embodiment of USB cable adapter with a cable winding mechanism according to the invention. In this preferred embodiment one end of cable is coupled to a connector for audio 3 and the other end thereof is coupled to an earphone 41, a microphone 42, or a combination thereof (as shown). This preferred embodiment is applied for a hands-free kit for use in a car or a computer.

While the invention herein disclosed has been described by means of specific embodiments, numerous modifications and variations could be made thereto by those skilled in the art without departing from the scope and spirit of the invention set forth in the claims.

What is claimed is:

1. A USB cable adapter, comprising
a first USB connector;
a second connector; and
a cable winding mechanism interconnecting the first and the second connectors, the mechanism comprising:
  a case comprising a substantially circular first case element including a spool extended inward from a center thereof and a longitudinal gap cut through the spool, and a substantially circular second case element matingly secured to the first case element, the second case element including a straight groove extended outwardly from a center thereof;
  a crown shaped rotating mechanism comprising a channel formed at a center thereof, the channel being tightly put on the spool, two opposite openings formed at a periphery thereof, an internal curved trough, a cavity disposed adjacent the curved trough, and an arcuate trough disposed adjacent the cavity and being in communication with one end of the curved trough;
  a roller moveably disposed at a junction of the straight groove and the curved trough in a non-operating position;
  a flat cable having one end coupled to the first USB connector and the other end coupled to the second connector; and
  a worm spring having an inner end formed as a straight piece inserted into the gap for securing onto the spool, the worm spring being received in the troughs.

2. The USB cable adapter of claim 1, wherein the second connector is a connector for video.

3. A cable winding device interconnecting first and second end connectors of a USB cable adapter, comprising:
  a case comprising a substantially circular first case element including a spool extended inward from a center thereof and a longitudinal gap cut through the spool, and a substantially circular second case element matingly secured to the first case element, the second case element including a straight groove extended outwardly from a center thereof;

a crown shaped rotating mechanism comprising a channel formed at a center thereof, the channel being tightly put on the spool, two opposite openings formed at a periphery thereof, an internal curved trough, a cavity disposed adjacent the curved trough, and an arcuate trough disposed adjacent the cavity and being in communication with one end of the curved trough;

a roller moveably disposed at a junction of the straight groove and the curved trough in a non-operating position;

a flat cable having one end coupled to the first USB connector and the other end coupled to the second connector; and a worm spring having an inner end formed as a straight piece inserted into the gap for securing onto the spool, the worm spring being received in the troughs, wherein a pulling of the cable causes the rotating mechanism to rotate counterclockwise and cause the roller to move toward the arcuate trough with the worm spring being deformed while the roller is sliding; a release of the pulling causes the roller to move in the cavity for locking; and a slight pulling of the cable from the locked position clears the roller from the cavity to move in the curved trough with stored energy of the compressed worm spring released so as to rotate the rotating mechanism clockwise for winding the cable.

* * * * *

(12) EX PARTE REEXAMINATION CERTIFICATE (7358th)
United States Patent
Lin et al.

(10) Number: US 6,733,328 C1
(45) Certificate Issued: Feb. 9, 2010

(54) USB CABLE ADAPTER WITH CABLE WINDING MECHANISM

(75) Inventors: Chen Che Lin, Keelung (TW); Te Kuang Wei, Jungli (TW)

(73) Assignee: CMO America, LLC, Sarasota, FL (US)

Reexamination Request:
No. 90/010,222, Jul. 17, 2008

Reexamination Certificate for:
Patent No.: 6,733,328
Issued: May 11, 2004
Appl. No.: 10/426,794
Filed: May 1, 2003

(30) Foreign Application Priority Data

May 2, 2002 (TW) .......................................... 91206121
May 2, 2002 (TW) .......................................... 91206122

(51) Int. Cl.
*H02G 11/02* (2006.01)
*H02G 11/00* (2006.01)
*H04M 1/15* (2006.01)

(52) U.S. Cl. ........................................ 439/501; 439/638
(58) Field of Classification Search ........................ None
See application file for complete search history.

(56) References Cited

U.S. PATENT DOCUMENTS

| 6,019,304 A | 2/2000 | Skowronski et al. |
| 6,315,231 B1 | 11/2001 | Liaom |
| 2002/0040945 A1 | 4/2002 | Stepancich et al. |

FOREIGN PATENT DOCUMENTS

GB 697640 9/1953

*Primary Examiner*—Eric B Kiss

(57) ABSTRACT

A cable winding device of a USB cable adapter is disclosed. The device comprises a case including a spool and a straight groove; a crown shaped rotating mechanism comprising a channel put on the spool, two opposite edge openings, an internal curved trough, a cavity adjacent the carved trough, and an arcuate trough adjacent the cavity; a roller in the straight groove; and a worm spring secured onto the spool. A pulling of a flat cable causes the roller to move toward the arcuate trough with the worm spring being deformed while the roller is sliding. A release of the pulling causes the roller to move in the cavity for locking. A slight pulling of the cable from the locked position clears the roller from the cavity to move in the curved trough with stored energy of the compressed worm spring released for winding the cable.

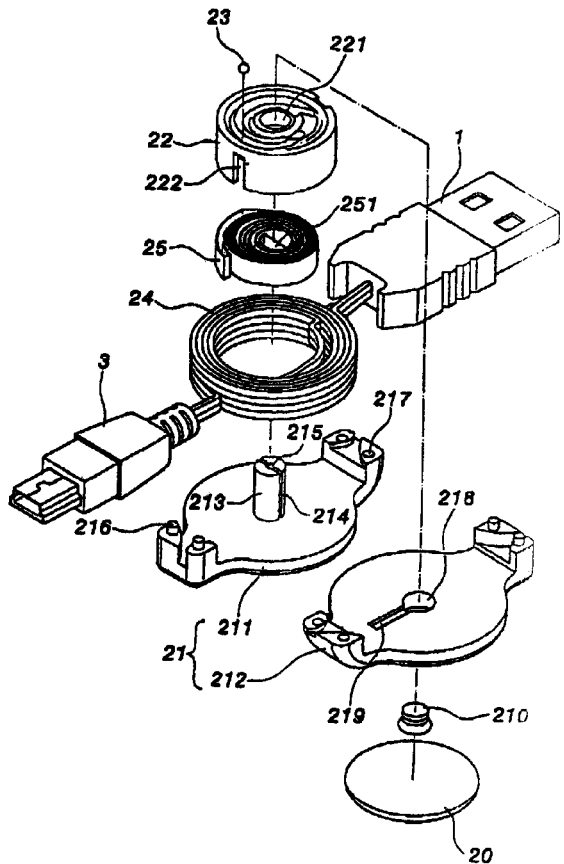

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 3 are determined to be patentable as amended.

Claim 2, dependent on an amended claim, is determined to be patentable.

1. A USB cable adapter, comprising:
   a first USB connector;
   a second connector; and
   a cable winding mechanism interconnecting the first and the second connectors, the mechanism comprising:
   a case comprising a substantially circular first case element including a spool extended inward from a center thereof and a longitudinal gap cut through the spool, and a substantially circular second case element matingly secured to the first case element, the second case element including a straight groove [extended] *extending radially* outwardly [from a center thereof] *and in open communication with a centrally positioned hole formed through said second case element*;
   a crown shaped rotating mechanism comprising a channel formed at a center thereof, the channel being tightly put on the spool, two opposite openings formed at a periphery thereof, an internal curved trough, a cavity disposed adjacent the curved trough, and an arcuate trough disposed adjacent the cavity and being in communication with one end of the curved trough;
   a roller moveably disposed at a juncton of the straight groove and the curved trough in non-operating position;
   a flat cable having one end coupled to the first USB connector and the other end coupled to the second connector; and
   a worm spring having an inner end formed as a straight piece inserted into the gap for securing onto the spool, the worm spring being received in the troughs.

3. A cable winding device interconnecting first and second end connectors of a USB cable adapter, comprising:
   a case comprising a substantially circular first case element including a spool extended inward from a center thereof and a longitudinal gap cut through the spool, and a substantially circular second case element matingly secured to the first case element, the second case element including a straight groove [extended] *extending radially* outwardly [from a center thereof] *and in open communication with a centrally positioned hole formed through said second case element*;
   a crown shaped rotating mechanism comprising a channel formed at a center thereof, the channel being tightly put on the spool, two opposite openings formed at a periphery thereof, an internal curved trough, a cavity disposed adjacent the curved trough, and an arcuate trough disposed adjacent the cavity and being in communication with one end of the curved trough;
   a roller moveably disposed at a junction of the straight groove and the curved trough in a non-operating position;
   a flat cable having one end coupled to the first USB connector and the other end coupled to the second connector; and
   a worm spring having an inner end formed as a straight piece inserted into the gap for securing onto the spool, the worm spring being received in the troughs,
   wherein a pulling of the cable causes the rotating mechanism to rotate counterclockwise and cause the roller to move toward the arcuate trough with the worm spring being deformed while the roller is sliding; a release of the pulling causes the roller to move in the cavity for locking; and a slight pulling of the cable from the locked position clears the roller from the cavity to move in the curved trough with stored energy of the compressed worm spring release so as to rotate the rotating mechanism clockwise for winding the cable.

* * * * *